April 18, 1939.  P. PHELPS  2,154,697
BAR CUTTER
Filed June 11, 1937  5 Sheets-Sheet 1

INVENTOR
Paul Phelps
BY
ATTORNEYS

April 18, 1939.　　　　P. PHELPS　　　　2,154,697
BAR CUTTER
Filed June 11, 1937　　　5 Sheets-Sheet 2

INVENTOR
*Paul Phelps*
BY
ATTORNEYS

April 18, 1939.  P. PHELPS  2,154,697
BAR CUTTER
Filed June 11, 1937  5 Sheets-Sheet 3

INVENTOR
Paul Phelps
BY
ATTORNEYS

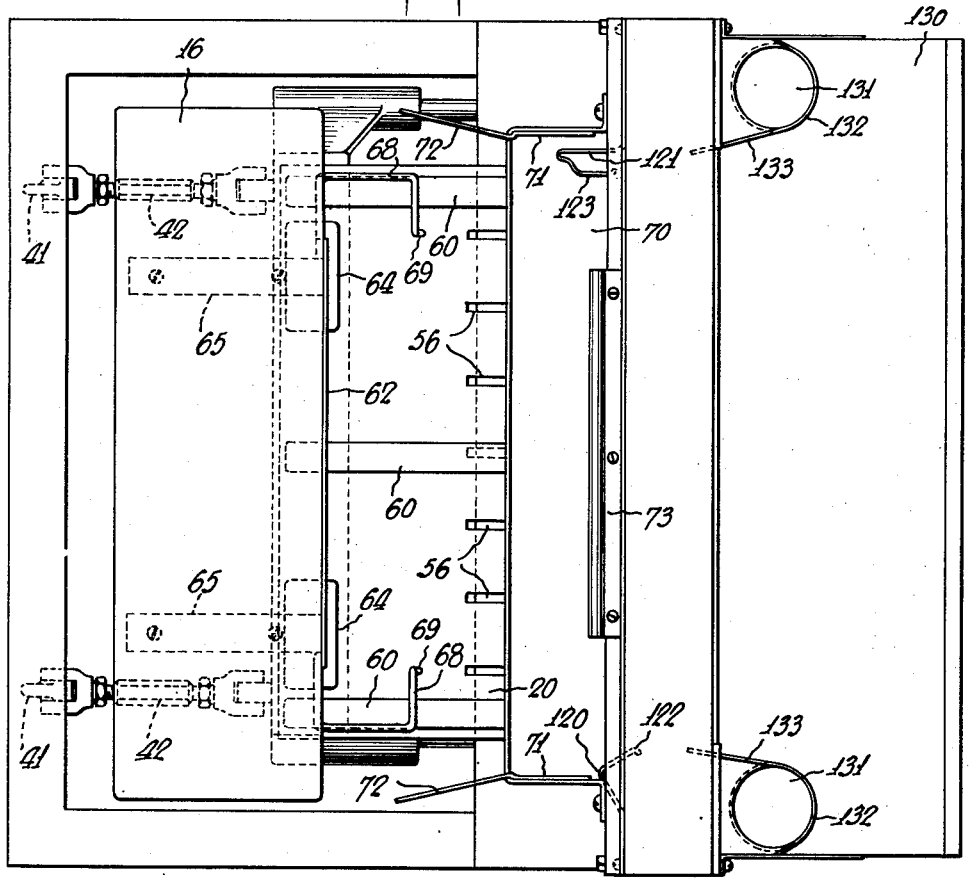
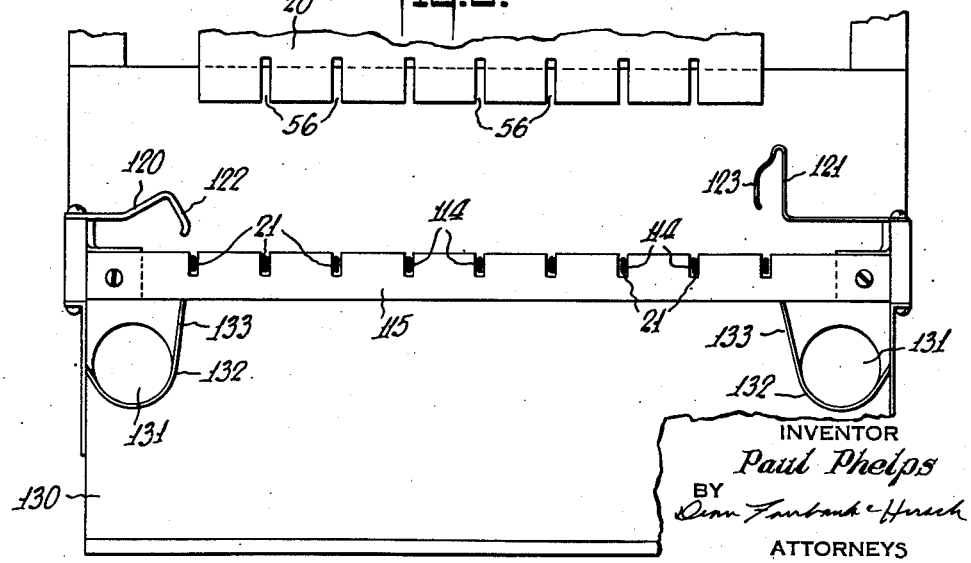

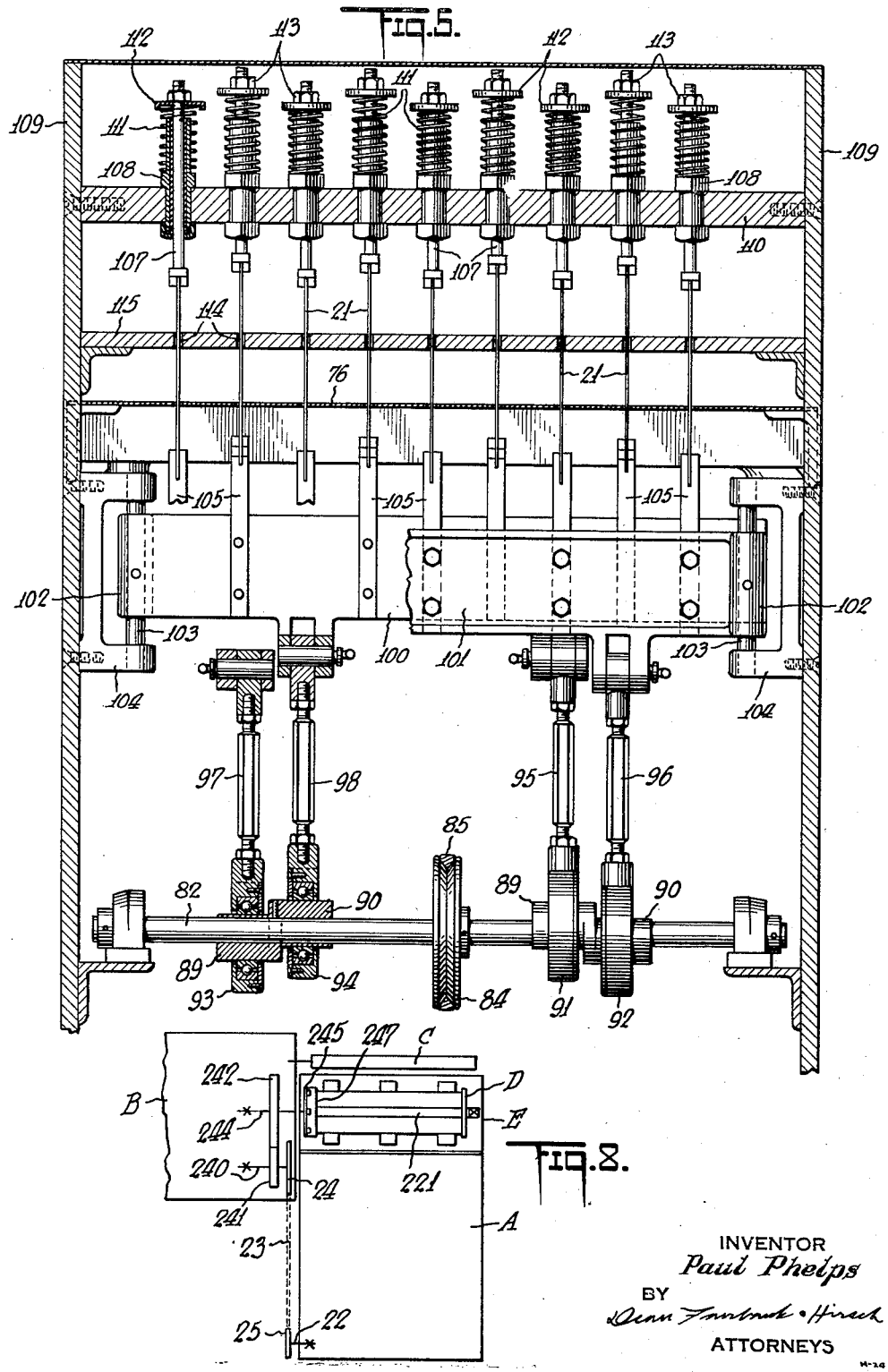
April 18, 1939. P. PHELPS 2,154,697
BAR CUTTER
Filed June 11, 1937 5 Sheets-Sheet 5
INVENTOR
Paul Phelps
BY
ATTORNEYS Patented Apr. 18, 1939

2,154,697

UNITED STATES PATENT OFFICE 2,154,697

BAR CUTTER

Paul Phelps, Louisville, Ky., assignor to The Girdler Corporation, Louisville, Ky., a corporation of Delaware Application June 11, 1937, Serial No. 147,670

8 Claims. (Cl. 107—21)

The invention relates to an apparatus for cutting bars or rods into a plurality of shorter sections, and more particularly to that type of apparatus in which the bar is moved laterally past a plurality of cutters in parallel planes and thereby cut simultaneously into a plurality of unit sections of the desired predetermined length. Merely as an example, the apparatus may be employed for cutting peripherally wrapped bars of frozen confections such as ice cream, water ice or sherbet but the plastic material may be butter, margarin, or the like. The bars may be made by apparatus of the type disclosed in the Vogt Patents 2,006,375 and 2,006,376 issued July 2, 1935. The unit sections cut by the apparatus of the present invention may be of the character shown and claimed in the Vogt Patents 1,906,183 issued April 25, 1933; 1,950,643 issued March 13, 1934, or 2,001,477 issued May 14, 1935, or the Routh Patent 2,062,277 issued November 24, 1936.

One object of the present invention is to provide an apparatus of the type referred to, in which the interval between the time a bar is delivered to the apparatus, and the time it is cut into shorter sections, is reduced to a minimum. This is highly desirable especially in cases where the bars to be subdivided are of a frozen plastic material which is liquid at room temperature, since any delay in the handling and cutting of such bars causes undesirable thawing and softening thereof.

As one feature of the invention, and whereby the time interval is reduced to a minimum, the carriage which feeds the bar to the cutters is automatically operated at a variable speed during each of its cycles of operation, so that it will have the necessary comparatively slow movement during the cutting stroke, and a much faster movement during non-cutting phases of its cycle.

Another object is to provide an apparatus of the type referred to, which is entirely automatic in its operation, and forms clean subdividing cuts.

As one important feature whereby this object is attained, the bar forming and cutting mechanism, the conveyor mechanism for advancing the bars formed and cut by said forming mechanism through a refrigerated hardening room, and the mechanism for cutting the hardened bars into individual service portions are so interrelated and so operated in synchronism as to effect a continuous mechanical operation in which no manual handling is involved from the time the bars are formed until after they are cut into individual service portions.

Another object is to provide a new and improved means for centering the bars with respect to the cutters in their passage through the apparatus, so that these bars will be in predetermined longitudinal position with respect to said cutters during cutting operation, thereby minimizing the trimming wastage at the ends of said bars.

A further object is to provide new and improved means for gently and effectively discharging the subdivided sections of the bar from the cutters to a receiving station at the completion of each cutting operation.

As a further feature of the present invention, there is provided a carriage, which is automatically reciprocated in timed sequence with the rate of delivery of the bars on to said carriage, and which is provided with a bar feeder adapted to feed the bars one at a time laterally past the cutters.

As a further feature the cutters are in the form of very narrow saws, each alternate one of which moves in the opposite direction to that of the other saws during each reciprocation whereby the movements are balanced and there is no need to clamp the bars and no tendency of them to roll.

Various other objects and features will be pointed out hereinafter or will be made apparent from a consideration of the following description in connection with the accompanying drawings, in which:—

Fig. 4 is a top plan view of the apparatus;

Fig. 5 is a section taken on line 5—5 of Fig. 2, but showing the two alternate sets of cutter blades in extreme opposite reciprocating positions;

Fig. 6 is a section taken on line 6—6 of Fig. 2;

Fig. 8 is a side elevation on a much smaller scale somewhat diagrammatically showing the synchronized interrelation of a bar forming mechanism, a hardening room conveyor and a cutting mechanism of the type shown in Figs. 1–6.

Figure 1:
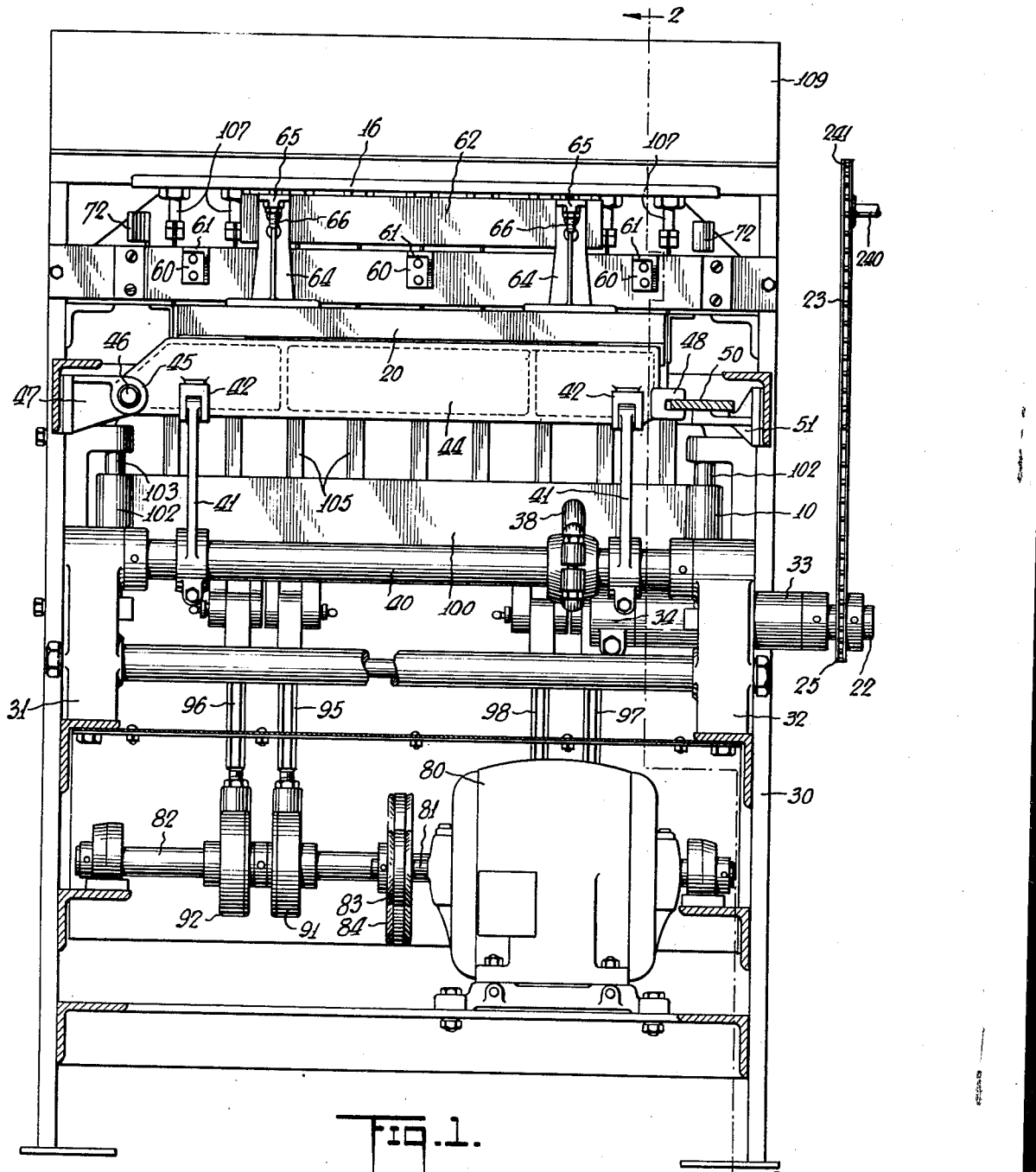
Fig. 1 is a rear elevation of an apparatus, embodying the present invention, parts of the frame being shown in section on the line 1—1 of Fig. 2, and parts diagrammatically.

The specific embodiment of the invention shown is particularly adapted for use with peripherally wrapped bars of partially frozen ice cream or the like. In Fig. 8 is shown a diagrammatic layout of various suitable apparatus which may be used for forming, cutting, hardening, and delivering these bars to the apparatus A of the present invention. In this layout, the material is delivered from a suitable apparatus (not shown) which, in the case of ice cream, partially freezes it to a comparatively stiff plastic form and incorporates therein the required amount of air to give it the desired overrun. Such an apparatus may be a continuous pressure freezer, for instance, of the type disclosed in Patents 1,783,864, 1,783,866 or 1,847,149. From this apparatus the partially frozen ice cream may be delivered to a bar forming and cutting apparatus B where it is encased in a wrapper and cut into sections of uniform lengths, for instance, approximating 20½ inches. The cut sections are delivered to a bar drop mechanism C which is automatically operable to release the bars therefrom and permit them to drop successively onto a conveyor D disposed in a refrigerated hardening room E. The bar sections are continuously advanced through the hardening room E by the conveyor D while being frozen to a hardened condition and are then successively delivered to the apparatus A of the present invention where they are cut into individual service portions.

The bar forming and cutting mechanism B, and the bar drop mechanism C may be similar to that shown in the copending application of Phelps and Hohl Serial No. 83,688 filed June 5, 1936, or may be of any other suitable form, although the bar forming mechanism may be as shown in Patents 2,006,375 or 2,006,376.

The refrigerating apparatus D, E, may be similar to that shown in the copending application of Phelps and Zoeller Serial No. 91,087, filed July 17, 1936, and includes a conveyor belt having a horizontal extension portion comprising a pair of superimposed substantially horizontal runs 10 and 11 (Figs. 2 and 3) enclosed in a cabinet extension 12 having a bottom wall 13 provided with an outlet opening 14. This conveyor belt carries a series of spaced clips 15 for supporting the bars as they are continuously advanced through the refrigerated cabinet, and as these clips on the bottom run 11 reach a position opposite the outlet opening 14 the bars therein are discharged on to a receiving table 16 extending below said opening and forming part of the bar cutting apparatus A of the present invention. The principle employed may be that disclosed or claimed in the Vogt and Phelps Patent 2,027,255.

In the operation of the cutting apparatus the bars F, after they are discharged upon the table 16, are successively transferred to a bar feeder 20, which is reciprocated to bring the bars successively and laterally past a gang of parallel cutters 21, and which is operated in synchronism with the hardening room conveyor so that the cutting of the successive bars is timed with the rate of delivery of the bars on to the receiving table 16.

Figure 2:
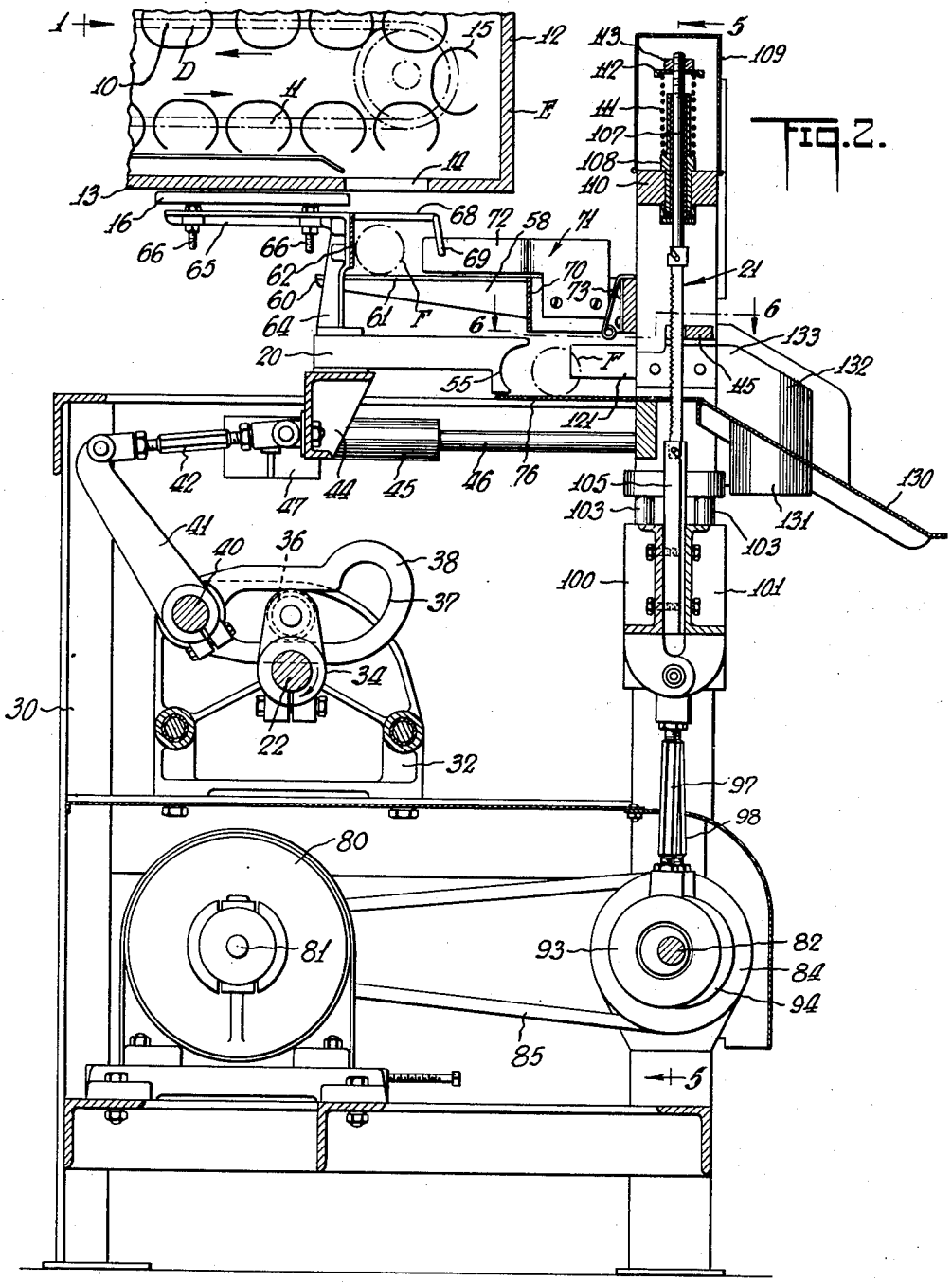
Fig. 2 is a section taken on line 2—2 of Fig. 1 and showing the bar feeder at the end of its return stroke.

In Fig. 8 is shown a diagrammatic view of the drive tie-up between the various mechanisms above referred to to effect a continuous automatic operation from the time the bars are formed to the time they are cut into individual service portions, the high numbered reference characters in this view corresponding to those of Fig. 2 in said Phelps and Hohl application.

In this layout the shaft 240 driven from the drive of the bar forming and cutting mechanism B carries the gear 241 which meshes with the gear 242 mounted on the shaft 244, which is connected to the conveyor drive shaft 221 through the clutch 245, 247. The cutting apparatus A of the present invention has a drive shaft 22 which is driven from the shaft 240 through a sprocket chain 23 passing over the sprockets 24 and 25 fixed respectively to said shafts. By means of this drive interconnection between the various apparatus referred to, there is effected a complete mechanization of the operation from the time the bar is formed to the time it is cut into individual portion sections.

The cutting apparatus A of the present invention includes a frame structure 30 carrying a pair of brackets 31 and 32, one of which, for instance the bracket 32, having an elongated bushing 33 in which is journaled the drive shaft 22. The two brackets 31 and 32 are interchangeable so that the power may be connected to either side of the machine.

Between the drive shaft 22 and the bar feeder 20 is a link mechanism for reciprocating said feeder. In the specific form shown this includes a crank arm 34 fixed at one end to the drive shaft 22 and carrying at its other end a roller crank pin 36, extending into a slot 37 formed in a yoke 38 which is fixed at one end to a rock shaft 40 mounted at its ends in the brackets 31 and 32. Also fixed to this rock shaft 40 is a pair of spaced arms 41, the outer ends of which are connected to a carriage 44 by a pair of links 42. This carriage 44 has the bar feeder 20 fixed thereon and is guided for horizontal reciprocal movement by any suitable means. For instance, one side of said carriage may have a sleeve 45, slidable along a rod 46 supported on a pair of spaced brackets 47 fixed to the frame structure of the machine, and the other side may be provided with a U-shaped extension 48 engaging one side of a guide bar 50 fixed by brackets 51 to the frame structure of the machine.

Figures 3, 7:
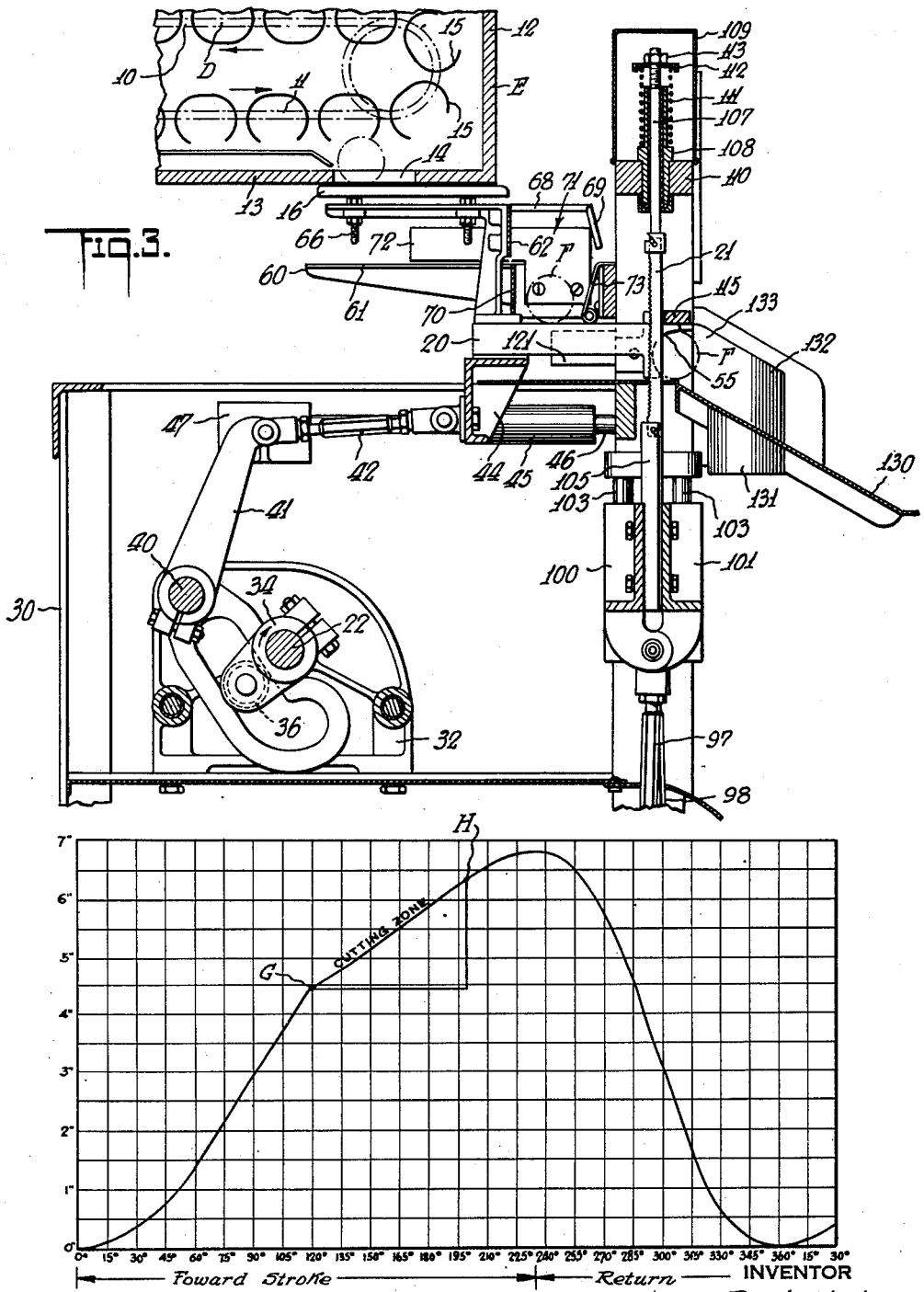
Fig. 3 is a section similar to Fig. 2 but showing the upper part of the apparatus with the bar feeder at the end of its forward stroke.
Fig. 7 is a diagram indicating the speed characteristic of the bar feeder.

The constant rotation of the crank arm 34 at a uniform angular velocity causes the angular oscillation of the slotted yoke 38, the rock shaft 40 and the arms 37, at a continuously changing rate of angular speed, varying from zero, when the radial center line of said crank arm 34 is at right angles to the radial center line of said yoke at each extreme position of said yoke as shown in Figs. 2 and 3, to a maximum speed when the radial center line of said crank is almost coincident with the radial center line of the yoke. This angular oscillation of the yoke 38 is modified by the link mechanism between said yoke and the carriage 44, so that the resultant action of said carriage is to move comparatively swiftly to the right from the position shown in Fig. 2, for a part of the forward stroke, then slowly for another part of said stroke during the cutting operation, and finally swiftly to the left during its return stroke.

In Fig. 7 is shown a diagram in which the abscissaes designate the angular movement of the crank arm 34 in a clockwise direction from the zero position shown in Fig. 2, and in which the ordinates indicate the inches of travel of the bar feeder 20 from the beginning of its forward stroke in Fig. 2. It should be noted from this diagram that the crank arm 34 rotates through an angular distance of approximately 235°, during the forward stroke of the bar feeder 20 and travels an angular distance of approximately 125° during the return movement of said feeder, so that this return movement is effected in approximately half the period required for the forward movement. As the bar feeder 20 reaches the cutting zone G, H, during its forward stroke, its speed is cut down almost to one-half.

The forward end of the bar feeder 20 is provided with a bar receiving recess 55 having a curvature conforming with the curvature of the outer periphery of the bar, and with a series of parallel slots 56 (Fig. 6) disposed in line with the cutters 21 to receive said cutters respectively during the cutting operation and extending rearwardly beyond the rear side of said recess.

The means for successively advancing the bars F from the table 16 to the recess 55 of the bar feeder 20 includes a fixed bar support 58, disposed above the bar feeder 20 and comprising a plurality of fixed spaced brackets 60 shown in the form of angle irons having horizontal bar supporting flanges 61.

For advancing the bars F forwardly along the fixed bar support 58 there is provided a movable bar pusher plate 62 disposed above the fixed brackets 60 and connected to the upper ends of a pair of brackets 64 which extend upwardly between adjacent bar supporting brackets 60 and which have their lower ends fixed to the top of the movable bar feeder 20. The upper ends have substantially horizontal rearward extensions 65, to which the table 16 is connected by any suitable means, as for instance, the screws 66. By means of this arrangement the reciprocation of the bar feeder 20 is transmitted to the pusher plate 62 so that any bar on the fixed support 58 will be moved forwardly by said plate during the forward movement of said feeder.

The table 16 moves across the bottom of the cabinet opening 14, and serves as a shutter plate to prevent the dropping of the bars through said opening and on to the fixed bar support 58, until the bar feeder 20 reaches the end of its return stroke shown in Fig. 2. In order to prevent the forward rolling of the bars as they are dropped through the cabinet opening 14 on to the fixed bar support 58 end pieces are secured to the ends of the pusher plate 62. These may be in the form of bars having U-shaped horizontal sections 68, and downwardly extending end sections 69 serving as abutments for the forward movement of said bars.

At the forward end of the fixed bar support 58 is a chute 70 having a cross section sufficiently large to permit the discharge of bars therethrough, and terminating at its lower end slightly above the upper surface of the bar feeder 20 to permit the movement of said feeder across the bottom of said chute. The bars are pushed forwardly along the fixed bar support 58 by the pusher plate 62 until they reach the chute 70 and are then discharged through said chute on to upper surface of bar feeder 20.

In order to center the bars longitudinally with respect to the cutters 21, as said bars are advanced towards the chute 70, there is provided a pair of fixed spaced guide plates 71 connected at one end to the walls of said chute and having oblique portions 72 converging towards said chute as shown in Fig. 4.

In order to prevent the bars from going askew as they are dropped through the chute 70, there is provided in said chute on the forward side thereof a baffle plate 73 connected at its upper end to a chute wall and extending downwardly and rearwardly between the side walls of said chute.

In the operation of the machine so far described, when the carriage 44 has reached its extreme forward position shown in Fig. 3 the shutter plate 16 will extend across the cabinet opening 14 and in this position one of the clips 15 of the lower run of the conveyor belt will be in discharge position with respect to said opening, so that the bar F disposed in said clip will drop on to said shutter plate 16. Near the end of the return stroke of the bar feeder 20, in the position shown in Fig. 2, the shutter plate 16 will uncover the cabinet opening 14 so that the bar F which is resting on said plate will discharge onto the fixed brackets 60 of the fixed bar support 58. Upon the next forward movement of the carriage 44, the bar F on the fixed brackets 60 is pushed forwardly by the pusher plate 62 until said bar reaches the chute 70. In this position the bar will fall through the chute 70 and on to the bar feeder 20 which at that phase will extend across the lower end of said chute. Upon the return movement of the bar feeder 20, and as soon as the forward end of said feeder has moved out of blocking position with respect to the outlet end of the chute 70, the bar which has been resting on top of said feeder will drop onto a fixed horizontal table shown in the form of a plate 76 disposed directly below said bar feeder. On the next forward motion of the bar feeder 20, the bar resting on the table 76, will be engaged by the curved recess 55 of the bar feeder 20 and pushed forwardly towards and between the cutters 21 to be subdivided thereby.

The cutters 21 for subdividing the bars transversely into individual service portions are in the form of saw blades which are reciprocated lengthwise at high speed and in such a manner that while each alternate saw blade is moving in one direction, the remaining saw blades will be moving in the opposite direction, thus balancing the lateral thrust on the bar resulting from the action of these blades.

The saw blade reciprocating means includes a motor 80 having a shaft 81 which drives a countershaft 82 through a rope drive which includes a pair of rope pulleys 83 and 84 connected to said motor shafts 81 and 82 respectively, and having a rope 85 passing thereover. Keyed to the shaft 82 are two pairs of cylindrical eccentric 89 and 90, diametrically offset from opposite sides of a shaft. One pair of eccentrics is engaged by two collars or housings 91 and 92 while the other two eccentrics are similarly engaged by a pair of collars 93 and 94. Threaded or otherwise fixed to these collars are connecting rods 95, 96, 97, and 98 which are preferably adjustable in length, as for instance by turnbuckles. The upper ends of the rods 95 and 98 are pivotally connected to a cross head 100, while the upper ends of the rods 96 and 97 are similarly connected to a cross head 101. These cross heads 100 and 101 are guided for vertical movement by a pair of slide sleeves 102 formed at the ends of each cross head, and slidably embracing guide rods 103 supported in fixed brackets 104. The eccentrics are so arranged on the shaft 82 that the rotation of said shaft causes the two cross heads 100 and 101 to be reciprocated in opposite directions, whereby one cross head is ascending while the other is descending.

Each of the cross heads 100, and 101 carries a series of saw blade holders 105, so arranged that the blade holders on one cross head are alternately disposed with regard to the blade holders on the other cross head. The lower ends of the saw blades 21 are detachably connected to the blade holders 105, as for instance, by means of bayonet slot connections, while the upper ends of these blades are similarly detachably connected to rods 107, slidable in guide sleeves 108 fixed to a stationary cross beam 110 on a housing 109. Each of these rods 107 is urged upwardly by a coil spring 111 encircling its associated sleeve 108 between a shoulder formed on said sleeve, and a washer 112 held beneath a nut 113 threaded onto the upper end of the rod.

The saw blades 21 extend through grooves 114 formed in a fixed saw guide 115, serving to prevent rotation of said saw blades, and to maintain them in parallel planes.

As the bar F is advanced by the bar feeder 20 along the plate 76, towards the reciprocating saw blades 21, it is longitudinally and accurately centered with respect to said blades by a pair of guide members 120 and 121 (Fig. 6) so that the same minimum amount of material is trimmed off each end of the bar by the end saw blades. The guide member 120 has an obliquely extending unyielding portion 122 which serves to push the bar lengthwise towards the right, as shown in Fig. 6, and towards the guide member 121.

The guide member 121 has a reversely bent yielding portion 123, which may move under the end thrust action of the bar F towards the right. The forward end of the guide portion 122 is disposed a slight distance to the left of the left end saw blade, while the spring portion 123 is adapted to be pressed by the bar a slight distance to the right of the right end saw blade and the width of the bar feeder 20 is slightly less than the length of the bar advanced by it, so that the bar as it emerges from between the two guide members 120 and 121 will be accurately centered with respect to the saw blades with the ends of said bar extending short equal distances beyond the corresponding end saw blades.

Merely as an example, the bars which are delivered to the machine of the present invention may be of about 2⅝ inches in diameter and about 20½ inches long. Nine equally spaced saw blades are shown for cutting these bars into eight individual portions, these blades being spaced about 2³⁵⁄₆₄ inches apart, so that only 1⁄16 inch layer is trimmed off each end of the bars by the end saw blades.

Connected to the forward end of the plate 76 is a downwardly inclined apron 130 forming a slide for the cut portions of the bar, and leading towards a station for receiving the cut individual service bar sections. The bar receiving recess 55 is so formed that the lower end thereof is spaced rearwardly from a vertical plane passing through the center of curvature of said recess 20 that when the bar feeder 20 reaches the end of its forward stroke the cut bar sections unsupported by the plate 76 will roll out of said recess onto the slide apron 130.

The slide apron 130 is formed on the sides thereof with downwardly extending chutes 131 which are partially encircled on the inner sides thereof by baffle plates 132 having rearwardly extending portions 133 which are adapted to separate the trimmed off portions of the bar from the other cut bar sections, and guide them towards said chutes for discharge therethrough. Suitable receptacles may be provided at the outlet ends of the chutes 131 for collecting the trimmed off portions of the bars.

Although the operation of the machine has been made apparent it may be briefly summarized as follows:

The bars are dropped onto the shutter plate 16 at a rate of one during each complete reciprocating cycle of the bar feeder 20 so that during the cutting phase there will be one bar on the shutter plate 16, one in the chute 70 resting on top of said bar feeder 20 and one being cut. During the return movement of this bar feeder 20, the bar on the shutter plate 16 will drop onto the fixed bar support 58, and the bar in the chute 70 will drop onto the plate 76 in front of the bar feeder 20. On the next forward movement of the bar feeder 20 the bar on the fixed support 58 will be shifted to the chute 70 and dropped therethrough, the bar on the plate 76 will be pushed by said bar feeder towards the cutters 21 and a bar will drop from the conveyor onto the shutter plate 16.

It will be understood that a wide variety of changes in the details of construction of the machine above described may be made without departing from the spirit or scope of my invention as defined in the appended claims.

Having thus described my invention what I claim as new and desire to secure by Letters Patent is:

1. A machine for cutting a bar of frozen comestible into unit sections, including a plurality of parallel cutters, a fixed bar support, means for delivering bars successively and at predetermined time intervals to said bar support, a bar feeder, means for transferring the bars from said bar support successively into cutter feeding position with respect to said bar feeder and means for reciprocating said feeder to periodically move a bar disposed in cutter feeding position laterally past said cutters.

2. A machine for cutting a bar of frozen comestible into unit sections, including a fixed bar support, a bar feeder below said bar support, a plurality of spaced cutters, means for reciprocating said bar feeder to move a bar disposed in cutter feeding position therewith laterally past said cutters, and means reciprocable with said bar feeder to transfer bars from said bar support successively into cutter feeding position with respect to said bar feeder.

3. A machine for cutting a bar of plastic comestible into unit sections, including a series of spaced parallel cutters, a fixed bar support including a plurality of interspaced brackets, a bar feeder below said bar support, means for reciprocating said bar feeder towards and from the field of operation of said cutters, means for delivering bars successively to said bar support at predetermined intervals, and means connected to said bar feeder and extending in the spaces between adjoining brackets for transferring the bars from said bar support to feeding position with respect to said bar feeder.

4. A machine for cuting a bar of plastic comestible into unit sections including a series of parallel cutters, a fixed bar support, a chute at one end of said support, a bar feeder disposed below said fixed bar support and below the outlet end of said chute, means for delivering bar sections onto said fixed bar support at predetermined timed intervals, means for advancing said bar sections along said fixed support to the inlet end of said chute, and means for reciprocating said bar feeder across the outlet end of said chute and towards and away from said cutters in timed sequence with the rate of delivery of the bars onto said fixed support.

5. A machine for cutting a bar of plastic comestible into unit sections including a series of parallel cutters, a bar feeder adapted to engage a bar on moving toward said cutters, means for adjusting the bar longitudinally of its axis while being moved by the feeder toward said cutters, and means for moving said bar feeder towards the field of operation of said cutter at a comparatively high rate of speed up to approximately the beginning of the cutting phase of said feeder, and at a slower speed during said cutting phase.

6. A machine for cutting a bar of plastic comestible into sections, including a gang of cutters, means for moving a series of bar sections successively and laterally past said cutters, and a pair of guides one at each side of the path of movement of the bar sections, one of said guides being substantially rigid and the other of said guides being yielding, to move all of said bar sections endwise to a predetermined position during the movement of the bars toward the zone of operation of said cutters.

7. A machine for cutting a bar of plastic comestible into sections, including a gang of cutters, means for moving a series of bar sections successively and laterally past said cutters, and a pair of diverging guides disposed beyond the cutters for directing the cut-off terminal portions of each bar laterally away from the remaining portions.

8. A machine for cutting a bar of plastic comestible into sections, including a gang of cutters, means for moving a series of bar sections successively and laterally past said cutters, a pair of diverging guides disposed beyond the cutters for directing the cut-off terminal portions of each bar laterally away from the remaining portions, an inclined chute for receiving the central portions, and chutes for receiving the terminal portions directed laterally by said guides.

PAUL PHELPS.